United States Patent Office 3,586,669
Patented June 22, 1971

3,586,669
ORALLY ACTIVE ANTI-ESTROGENIC COMPOUNDS
Gary H. Rasmusson, Watchung, and Glen E. Arth, Cranford, N.J., assignors to Merck & Co., Inc., Rahway, N.J.
No Drawing. Filed Apr. 22, 1969, Ser. No. 818,447
Int. Cl. C07c *173/00*
U.S. Cl. 260—239.55         9 Claims

ABSTRACT OF THE DISCLOSURE

Novel 3-ethers of 19-nor-20-spirox-4-ene prepared from the corresponding 3-beta allylic alcohol having utility as orally active anti-estrogens with low progestational activity.

FIELD OF THE INVENTION

Orally active anti-estrogenic compounds.

DESCRIPTION OF THE PRIOR ART

The 3-enol ethers of 20-spirox-4-en-3-ones are described in U.S. Pat. 3,254,074 to Arth, Schwam and Sarett, and are disclosed as being aldosterone inhibitors. The esters of 19-nor-20-spirox-4-ene-3β-ols which are useful as estrogen antagonists are disclosed in U.S. Pat. 3,297,686 to Brown. It has been found, however, that the compounds disclosed and claimed in Pat. 3,297,686 possess a higher degree of progestational activity and lower degree of oral efficacy, than is desirable. Compounds were therefore sought which would overcome these disadvantages.

SUMMARY OF THE INVENTION

The compounds of the present invention are 3-ethers of 19-nor-20-spirox-4-ene which possess a high degree of oral estrogen antagonist activity and at the same time, exhibit low progestational (Clauberg) activity.

This discovery of oral activity is most surprising since heretofore, it was believed that the oral activity of compounds in the spiroxenone series was relatively low. The specific utility of these compounds is as an antagonist to the uterine growth stimulating activity of estrone and compounds of estrone-like activity. Because of this antiestrogenic activity, the novel compounds of this invention may be used as antiferitility controls in domestic animals. They may be used to regulate the estrus cycle, and in cases of menstrual disturbances, may be used to re-establish the normal relationships between the anterior pituitary ovary and endometrium which are present in a normal estrus cycle. They may also be used to synchronize the estrus cycle of a herd or colory of domestic animals or to chronically suppress estrus in domestic animals. When used for these purposes, the novel compounds may be supplied together or in succession with other estrusregulatory steroids or chemical compounds. The novel compounds of this invention may be administered orally and for this purpose a wide variety of dosage forms may be used in which they may be present singly, or in admixture with another active ingredient. In the various dosage forms, they can be combined with an inert solid diluent or dissolved, dispersed, or suspended in a suitable liquid carrier. When combined with an inert solid diluent, they may be in suitable dosage unit form, more particularly in the form of a tablet, powder, capsule, or the like. When combined with a liquid diluent, the composition may be in the form of a solution, emulsion, suspension or the like.

The compounds of the present invention may be prepared by either of two general modes of synthesis.

In the first mode, 19-nor-20-spirox-4-en-3β-ol (referred to herein as the allylic alcohol) is treated with a strong base in an anhydrous medium and the reaction product thereof is then treated with an alkyl, cycloalkyl, or substituted alkyl halide or sulfate corresponding to the ultimately desired alkoxy group.

In an alternate mode of formation, when it is desired to form a heterocycloalkyl ether, the allylic alcohol is treated with the desired heterocycloalkene in the presence of an acyl halide followed by treatment with an organic base. The compounds of the present invention may be designated by the following general formula

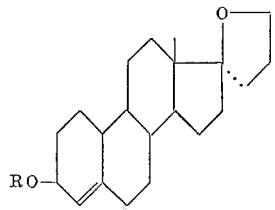

wherein R is alkyl, cycloalkyl, substituted alkyl or heterocycloalkyl.

DESCRIPTION OF THE PREFERRED EMBODIMENTS

The novel compounds of the present invention are the 3-ethers of 19-nor-20-spirox-4-ene. Among the preferred ethers are alkyl or substituted alkyl ethers. Suitably, lower alkyl ethers are employed wherein the alkyl moiety is branched chain or straight chain, having from 1–8 carbon atoms, such as methyl, ethyl, propyl, butyl, pentyl, heptyl, and the like. The substituted alkyl ethers include di(alkyl) aminoalkyl, suitably, di(loweralkyl)aminoloweralkyl and preferably di(loweralkyl)aminoethyl wherein the specific embodiments of the lower alkyl moiety are as above. Alkenyl, suitably beta-alkenyl such as allyl can also be considered substituted ethers. Other ethers are those containing groups exemplified by cycloloweralkyl such as cyclopropyl, cyclopentyl, or cyclohexyl; and heterocycloalkyl such as furyl, pyranyl, and the like.

In one mode of preparation of the compounds of the present invention, 19-nor-20-spirox-4-en-3-beta-ol (preparable by the procedure set forth in U.S. Pat. No. 3,297,-686) is treated with a base in an anhydrous medium. The preferred bases are strong bases soluble in anhydrous organic media, suitably alkali metal alkyls or alkali metal hydrides for example, methyl lithium, butyl lithium, butyl sodium, sodium hydride, potassium hydride, and the like. The solvent used will necessarily depend upon the base chosen. However, among suitable solvents are the loweralkoxyloweralkanes such as diethyl ether, and tetrahydrofuran, dimethylsulfoxide, di(loweralkoxy)loweralkanes such as dimethoxyethane, and the like. A slight excess of base is utilized, while the degree of excess is not critical, about 2 to about 4 mols of base per mole of allylic alcohol may be used. The temperature at which this initial reaction is carried out is also a function of the base utilized. The reaction may suitably be carried out at temperatures ranging between $-10°$ and $+30°$ C., and for from 10 to 60 minutes duration. Where the base utilized in methyl lithium, it is preferred to mix the reagents at a temperature of between about $-10°$ to $+10°$ C. suitably at around $0°$ C., while, where the base is sodium hydride a higher temperature is preferred, for example, from about $15°$ to about $20°$ C.

It is further preferred though not critical to carry out the reaction in an inert atmosphere, suitably in the presence of an inert gas such as nitrogen or the like.

After the reaction between the base and the allylic alcohol is complete, i.e. after from 10 to 60 minutes, there is added to the reaction mixture the alkyl, (or cycloalkyl or substituted alkyl) halide or sulfate. For example, there may be used the corresponding alkyl chloride, alkyl bromide, alkyl iodide, the alkyl bromide being preferred; or the corresponding dialkyl sulfate. The alkyl groups are those mentioned above as the alkyl moiety of the alkoxy portion of the ether grouping at carbon 3 of the final compound. An excess of the halide or sulfate may be used, between about 2 to about 5, suitably about 3 equivalents of halide or sulfate per mole of allylic alcohol being preferred. The reaction is then permitted to proceed, suitably at ambient temperatures, either with or without stirring, for a period of from about 2 to about 20 hours.

The reaction mixture is then worked up to yield the desired 3-ether of 19-nor-20-spirox-4-ene. The reaction mixture is diluted with water without the addition of base, extracted, dried and concentrated as before. The product, a 3-ether of 19-nor-20-spirox-4-ene, thus obtained is purified by elution through neutral alumina, suitably with benzene to give the desired crystalline product which is then recrystallized from a suitable solvent.

Where it is desired to form the ether, wherein the alkoxy group is a heterocycloalkoxy group, for example, the tetrahydropyranyl or tetrahydrofuranyl ethers, it is preferred to utilize a different mode of synthesis. In this modification the allylic alcohol is treated with the corresponding heterocycloalkene such as dihydropyran or dihydrofuran in the presence of an acyl halide. A large excess of cycloalkene is preferred, suitably from about 5-10 mols per mol of allylic alcohol. While the particular acyl halide utilized is by no means critical to the present invention, an aryl sulfonyl halide such as benzene sulfonyl chloride or p-toluene sulfonyl chloride are preferred. The amount of acyl halide is somewhat in excess of what may be considered to be catalytic amounts but need not be as much as the equivalent amount, from 0.1 to 1.0 mol, and suitably about 0.25 mol of acyl halide per mol of allylic alcohol. In the preferred modification of the present invention the reaction proceeds at ambient temperatures, that is to say, in a range of between 10° to about 30° C. preferably from about 15° to about 20° C. for from about 10 to about 30 hours suitably for about 18 to 24 hours. If desired the reaction mixture may be stirred. The reaction may also be carried out in an inert atmosphere such as a nitrogen atmosphere.

Upon completion of the reaction, the reaction mixture is worked-up and the product isolated. In the preferred modification of the isolation procedure the acyl halide is neutralized by the addition of an excess amount of base, suitably an organic base such as pyridine or the like, and the reaction mixture concentrated under reduced pressure, to remove the excess dihydropyran. The residue is then base exchanged, suitably by addition of a dilute aqueous solution of sodium bicarbonate, and the product extracted into a water immiscible organic solvent, such as chloroform, carbon tetrachloride, or the like. This organic layer is then separated, washed, dried and concentrated in the usual manner. The residue may be triturated with a lower alkanol, suitably methanol to give the desired ether in crystalline form.

This invention is further described by the following examples.

EXAMPLE 1

3β-methoxy-19-nor-20-spirox-4-ene

A solution of 5.3 grams of 19-nor-20-spirox-4-en-3β-ol is prepared in 250 ml. of dry dimethoxyethane, cooled to 0° C. and treated with a solution of 1.6 N methyl lithium in ether until no further evolution of gas is noted. The resulting solution is stirred at about 0° C. for about 10 minutes and treated with 10.2 g. of dimethyl sulfate. The temperature of the solution is permitted to rise to the ambient temperature and stirred for about 3.5 hours. 25 g. of solid sodium bicarbonate is added followed by 250 ml. of water. The resulting suspension is stirred at ambient temperature for a further 16 hours and concentrated under reduced pressure to remove the bulk of the organic solvent.

The residual aqueous mixture is extracted with ether, the ether layer separated, washed sequentially with water and saturated aqueous sodium chloride and dried over sodium sulfate. After filtration the solution is concentrated to yield the desired product. Recrystallization from methanol at Dry Ice temperature yields 3β-methoxy-19-nor-20-spirox-4-ene M.P. 61–62° C. Where recrystallization is carried out at room temperature there is obtained a different crystalline form, M.P. 76–78° C.

In accordance with the above procedure, but where in place of dimethyl sulfate there is utilized diethyl sulfate, dibutyl sulfate, diethylaminoethyl chloride, or allyl bromide there are obtained 3β-ethoxy-19-nor-20-spirox-4-ene, 3β-butoxy - 19 - nor - 20 - spirox-4-ene, 3β-diethylaminoethoxy-19-nor-20-spirox - 4 - ene, and 3β-allyloxy-19-nor-20-spirox-4-ene, respectively.

EXAMPLE 2

3β-ethoxy-19-nor-20-spirox-4-ene

A solution of 300 mg. of 19-nor-20-spirox-4-en-3β-ol is prepared in 5 ml. of anhydrous dimethyl sulfoxide and treated with 50 mg. of sodium hydride (free of mineral oil). The mixture is stirred at ambient temperature for one hour, 2 ml. of ethyl bromide added thereto and the mixture stirred under nitrogen for 16 hours.

25 ml. of water are added to the mixture which is extracted with ethyl ether. The ether layer is separated, washed with water, dried over sodium sulfate, and concentrated to yield a residue. The residue is eluted through a column containing 9 g. of neutral alumina using benzene as the eluant. Evaporation of the benzene yields a crystalline product which upon recrystallization from hexane yields the 3β-ethoxy-19-nor-20-spirox-4-ene, M.P. 72–73° C.

In accordance with the foregoing procedure but where in place of ethyl bromide there is utilized cyclopentyl bromide or cyclohexyl bromide there is obtained 3β-cyclopentoxy-19-nor-20-spirox-4-ene, and 3β-cyclohexoxy - 19-nor-20-spirox-4-ene, respectively.

EXAMPLE 3

3β-tetrahydropyranyloxy-19-nor-20-spirox-4-ene

A solution of 150 mg. of 19-nor-20-spirox-4-en-3β-ol and 25 mg of p-toluene sulfonyl chloride is prepared in 1 ml. of redistilled dihydropyran and stirred at ambient temperature for 22 hours. 0.25 ml. of pyridine are added and the mixture concentrated under reduced pressure to remove excess dihydropyran. The residue is stirred for one hour with 1.5 ml. of 5% (w./w.) aqueous sodium bicarbonate and the mixture extracted with chloroform. The chloroform layer is separated, washed with water, and dried over sodium sulfate, and concentrated to yield a residue. Trituration of the residue with methanol yields 3β-tetrahydropyranyloxy - 19 - nor-20-spirox-4-ene, M.P. 98–119° C.

In accordance with the foregoing procedure but where in place of dihydropyran there is ustilized dihydrofuran, there is obtained 3β-tetrahydrofuranyloxy - 19 - nor-20-spirox-4-ene.

We claim:
1. A process for the preparation of a compound having the formula

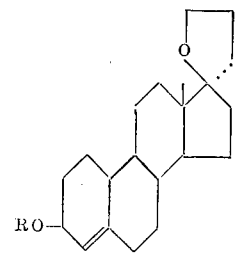

wherein R is tetrahydropyranyl or tetrahydrofuranyl, which comprises treating 19-nor-20-spirox-4-en-3β-ol with dihydropyran or dihydrofuran, respectively, in the presence of a p-toluene sulfonyl chloride or benzene sulfonyl chloride.

2. A compound having the formula

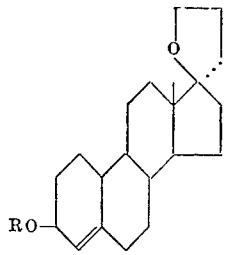

wherein R is lower alkyl having 1–8 carbon atoms, diethylaminoethyl, cyclo(lower alkyl) having 3–6 carbon atoms, or allyl.

3. A compound according to claim 2 wherein R is methyl, ethyl, diethylaminoethyl, cyclopentyl, cyclohexyl, or allyl.

4. The compound according to claim 2 which is 3β-methoxy-19-nor-20-spirox-4-ene.

5. The compound according to claim 2 which is 3β-ethoxy-19-nor-20-spirox-4-ene.

6. The compound according to claim 2 which is 3β-di(ethylamino)ethoxy-19-nor-20-spirox-4-ene.

7. The compound according to claim 2 which is 3β-allyloxy-19-nor-20-spirox-4-ene.

8. The compound according to claim 2 which is 3β-cyclopentoxy-19-nor-20-spirox-4-ene.

9. The compound according to claim 2 which is 3β-cyclohexoxy-19-nor-20-spirox-4-ene.

References Cited

UNITED STATES PATENTS

| | | | |
|---|---|---|---|
| 3,151,133 | 9/1964 | Cantrall et al. | 260—397.5 |
| 3,412,087 | 11/1968 | Edwards | 260—239.55 |
| 3,424,750 | 1/1969 | Fried | 260—239.55 |

HENRY A. FRENCH, Primary Examiner

U.S. Cl. X.R.

260—999